(12) United States Patent
Wu

(10) Patent No.: US 8,448,075 B2
(45) Date of Patent: May 21, 2013

(54) METHOD AND SYSTEM FOR SAVING INTERNET BOOKMARK AND COMPUTER-READABLE MEDIUM USING THE METHOD

(75) Inventor: Kun-Da Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 236 days.

(21) Appl. No.: 12/761,383

(22) Filed: Apr. 15, 2010

(65) Prior Publication Data
US 2010/0306679 A1    Dec. 2, 2010

(30) Foreign Application Priority Data

May 26, 2009    (TW) ................................ 98117446 A

(51) Int. Cl.
*G06F 3/00*    (2006.01)
(52) U.S. Cl.
USPC ........................................... 715/760; 715/838
(58) Field of Classification Search
USPC .......................... 715/760, 781, 838
See application file for complete search history.

(56) References Cited

U.S. PATENT DOCUMENTS

| | | | |
|---|---|---|---|
| 6,262,731 B1 | 7/2001 | Hasegawa | |
| 6,272,484 B1 | 8/2001 | Martin et al. | |
| 2003/0030679 A1 | 2/2003 | Jain | |
| 2005/0216850 A1 | 9/2005 | Ramos et al. | |
| 2006/0224997 A1 | 10/2006 | Wong et al. | |
| 2008/0189620 A1* | 8/2008 | Bonforte et al. | 715/751 |
| 2008/0313722 A1 | 12/2008 | Cho et al. | |
| 2009/0199106 A1* | 8/2009 | Jonsson et al. | 715/744 |
| 2010/0313170 A1* | 12/2010 | Ramos et al. | 715/838 |

FOREIGN PATENT DOCUMENTS

| | | |
|---|---|---|
| KR | 100851303 | 8/2008 |
| TW | I287196 | 9/2007 |
| TW | 200820021 | 5/2008 |

OTHER PUBLICATIONS

"2nd Office Action of European Counterpart Application", issued on Feb. 21, 2011, p. 1-p. 8.
Helfman J I et al: "Image representations for accessing and organizing Web information", Proceedings of the SPIE—The International Society for Optical Engineering SPIE, USA, vol. 4311, 2001, pp. 91-101, ISSN: 0277-786X.
"Search report of Europe counterpart application", issued on Jun. 1, 2010, p. 1-p. 3.
"Office Action of Europe counterpart application", issued on Jun. 30, 2010, p. 1-p. 6.
"First Office Action of China Counterpart Application", issued on Jun. 9, 2011, p. 1-p. 6.
"Office Action of Taiwan counterpart application" issued on Apr. 12, 2013, p1-p6, in which the listed references were cited.

* cited by examiner

*Primary Examiner* — Omar Abdul-Ali
(74) *Attorney, Agent, or Firm* — Jianq Chyun IP Office

(57) ABSTRACT

A method and a system for saving an Internet bookmark and a computer-readable medium using the method are provided. In the present method, a web page is first connected to. Then, an image of a particular area in the web page is captured and served as a representative image of an Internet bookmark of the web page. Next, the representative image is associated with a web address of the web page. Thereafter, the representative image and the web address are saved.

18 Claims, 5 Drawing Sheets

METHOD AND SYSTEM FOR SAVING INTERNET BOOKMARK AND COMPUTER-READABLE MEDIUM USING THE METHOD

CROSS-REFERENCE TO RELATED APPLICATION

This application claims the priority benefit of Taiwan application serial No. 98117446, filed on May 26, 2009. The entirety of the above-mentioned patent application is hereby incorporated by reference herein and made a part of this specification.

BACKGROUND

1. Field of the Application

The present application generally relates to a method for saving an Internet bookmark, and more particularly, to a method and a system for saving an Internet bookmark by serving a web page image as a representative image (visual bookmark) and a computer program product using the method.

2. Description of Related Art

Nowadays, many web pages are set up on the Internet. Techniques for saving web addresses of these web pages to Internet bookmarks have been developed in order to allow Internet users to browse these web pages conveniently.

An Internet bookmark allows a user to cataloguing and save his favorite web pages so that subsequently, the user can connect to his favorite web pages through this Internet bookmark. The user can save multiple web addresses into the Internet bookmark as shortcuts for connecting to these web pages, and meanwhile, the user can assign a corresponding title to each of these shortcuts. Accordingly, the user can identify a web page linked to a shortcut according to the web address and the title saved in the shortcut.

However, when there are too many shortcuts in the Internet bookmark, the user may get confused and accordingly not be able to identify the web page linked to each shortcut by the title of the shortcut. In this case, the user has to open up the web pages one by one to identify the contents thereof, which is very inconvenient and time-consuming.

Additionally, such an Internet bookmark that the image of an entire web page is served as a representative image has been provided. However, when a user browses the web page through a small-sized display, the resolution of the representative image is greatly reduced due to the limitation of the image size. As a result, the text and image presented in the representative image of the Internet bookmark is too small to be read and accordingly it is very difficult for the user to identify the web page.

SUMMARY

Accordingly, the present application is directed to an Internet bookmark saving method, wherein an image of a particular area in a web page is captured and served as a representative image of an Internet bookmark of the web page.

The present application is directed to an Internet bookmark saving system, wherein a user may instantly connect to his/her favourite web pages through a visually presented Internet bookmark.

The present application is directed to a computer-readable medium, wherein a computer program is loaded into an electronic device to execute foregoing Internet bookmark saving method, so that a user can connect to his favorite web pages through an Internet bookmark.

The present application provides an Internet bookmark saving method. First, a web page is connected to. Then, an image of a particular area in the web page is captured and served as a representative image of an Internet bookmark of the web page. Next, the representative image is associated with the web address of the web page. Thereafter, the representative image and the web address are saved.

According to an example of the present application, in the Internet bookmark saving method, whether the web page specifies a web page size, for example a fixed width of the web page, is further determined, wherein if the web page specifies the web page size, a top left part of the web page is determined as the particular area, and if the web page does not specifies the web page size, a top middle part of the web page is determined as the particular area.

According to an example of the present application, in the Internet bookmark saving method, a web page title of the web page is associated with the representative image. In addition, an input title may also be received and associated with the representative image.

According to an example of the present application, the representative image is in an original scale of the captured image.

According to an example of the present application, the web address associated with the representative image is connected to when the representative image is activated.

The present application provides an Internet bookmark saving system comprising a connection module, a capture module, and a storage unit. The capture module is coupled to the connection module. The storage unit is coupled to the capture module. The connection module connects to a web page. Then, the capture module captures an image of a particular area in the web page and serves the captured image as a representative image of an Internet bookmark of the web page. Next, the capture module associates the representative image with a web address of the web page and stores the representative image and the web address into the storage unit.

According to an example of the present application, the Internet bookmark saving system further comprises a processing module respectively coupled to the connection module and the capture module. The processing module determines whether the web page specifies a web page size. If the processing module determines that the web page specifies the web page size, the processing module determines a top left part of the web page as the particular area, and if the processing module determines that the web page does not specifies the web page size, the processing module determines a top middle part of the web page as the particular area. In addition, the processing module may associate the web page title with the representative image through the capture module. Furthermore, the processing module may receive an input title and associates the input title with the representative image through the capture module.

According to an example of the present application, the representative image is in an original scale of the captured image.

According to an example of the present application, the connection module connects to the web address associated with the representative image when the representative image is activated.

The code to support the functionality of the Internet bookmark saving method and system may be stored on a computer-readable medium such as an optical drive, flash memory, or hard drive. The computer-readable medium includes a plurality of program instructions (for example, an organization chart establishing program instruction, a table approving program instruction, a setting program instruction, and a deployment program instruction, etc). These program instructions can be loaded into an electronic device and executed by the same to accomplish the steps in foregoing Internet bookmark saving method and the functions of foregoing Internet bookmark saving system.

As described above, in the present application, an image of a particular area in a web page is captured and served as a representative image of an Internet bookmark of the web page, and the scale of the representative image can be clearly displayed and recognized by the user when a user browses the Internet bookmark.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DETAILED DESCRIPTION

Reference will now be made in detail to the present examples of the application, examples of which are illustrated in the accompanying drawings.

Generally, once there are too many Internet shortcuts in the conventional Internet bookmarks, a user may get confused and not be able to identify the web page linked to each of the shortcuts. Besides, if the image of an entire web page is served as a representative image of the web page, when the web page is browsed through a small-sized display, the text presented in the representative image of the Internet bookmark may be too small to be read and identified. Accordingly, a method and a system for saving an Internet bookmark and a computer-readable medium using the method are provided in the present application, wherein the image of a particular area in a web page is captured and served as a representative image of an Internet bookmark of the web page, so that subsequently a user may connect to the web page through the representative image. Examples of the present application will be described below with reference to accompanying drawings.

Figure 1:
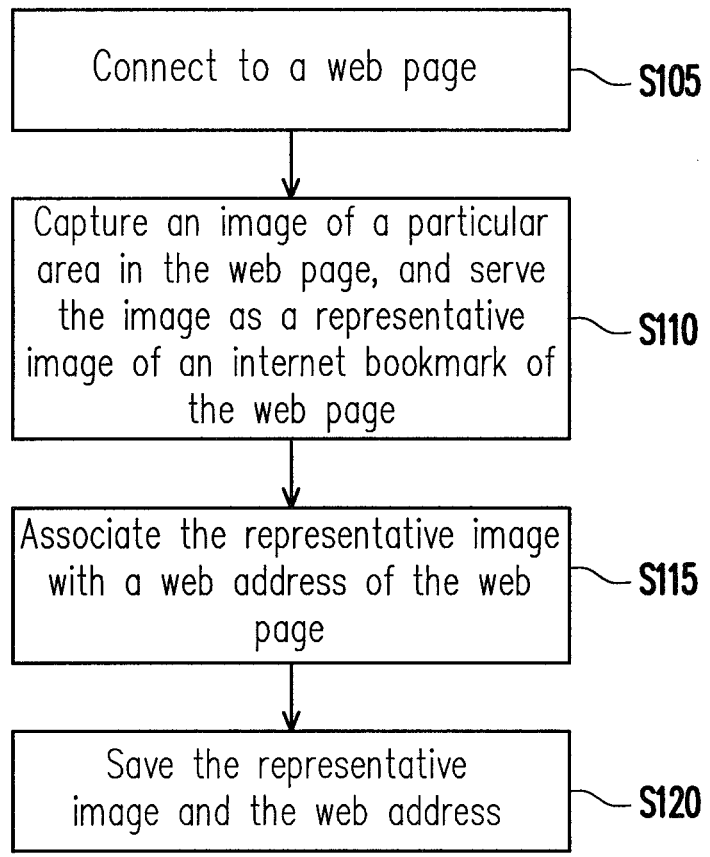
FIG. 1 is a flowchart of an Internet bookmark saving method according to an example of the present application.

FIG. 1 is a flowchart of an Internet bookmark saving method according to an example of the present application. Referring to FIG. 1, first, in step S105, a web page is connected to. For example, a browser is executed and the web page is connected to through the web browser.

Then, when the web page is being downloaded or after the web page has been completely downloaded, in step S110, an image of a particular area in the web page is captured and served as a representative image of an Internet bookmark of the web page. Generally, a website places a representative symbol, logo, text, etc thereof on the top left part of its homepage. Thus, in the present example, the top left part of the web page is determined as the particular area so that the image of the most representative part of the web page may be obtained by capturing an image of the particular area in the web page.

In one example, if a web page does not specify its web page size, for example a fixed width of the web page, the representative symbol thereof is usually placed in the middle when the browser is executed or resized (for example, the search engine website "Google"). Thus, whether the top left part or the top middle part of a web page is served as the particular area may be determined by determining whether the web page specifies its web page size.

Namely, whether the web page specifies its web page size is first determined before step S110 is executed. If the web page specifies the web page size, the top left part of the web page is determined as the particular area, and step S110 is then executed. Contrarily, if the web page does not specify the web page size, the top middle part of the web page is determined as the particular area, and step S110 is then executed.

Figure 2A:
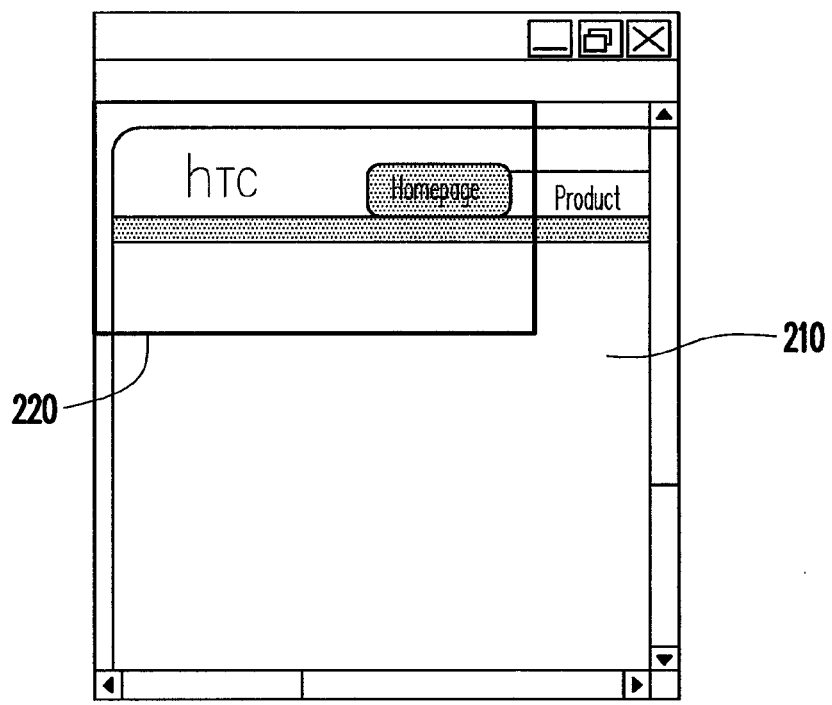
FIG. 2A and FIG. 2B are diagrams of web page browsing according to an example of the present application.
Figure 2B:
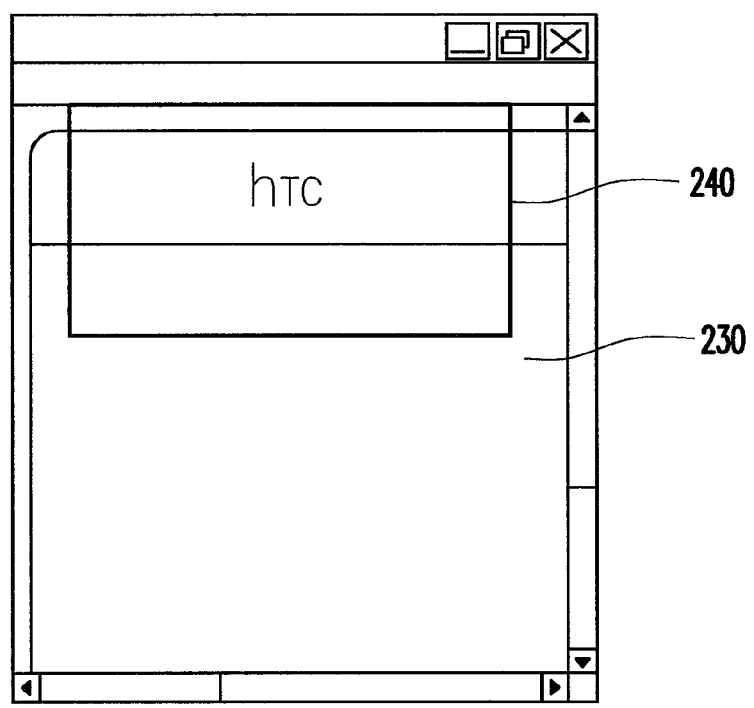
Figure 3A:
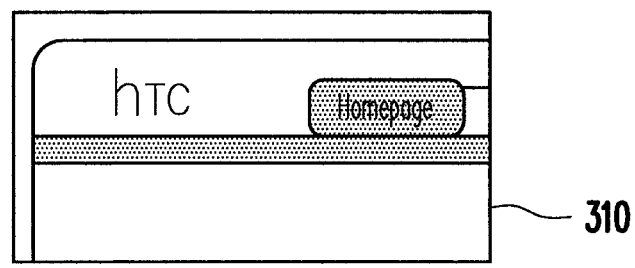
FIG. 3A and FIG. 3B are diagrams of representative images of web pages according to an example of the present application.
Figure 3B:
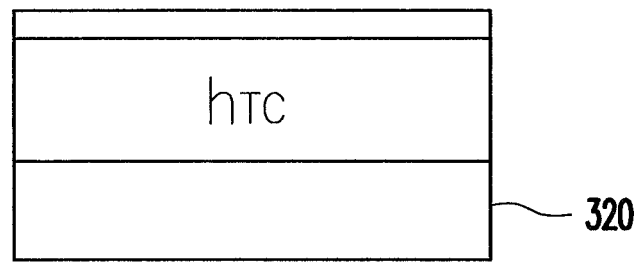

FIG. 2A and FIG. 2B are diagrams of web page browsing according to an example of the present application. FIG. 3A and FIG. 3B are diagrams of representative images of web pages according to another example of the present application. The web page 210 in FIG. 2A specifies its web page size, and the web page 230 in FIG. 2B does not specify its web page size. FIG. 3A and FIG. 3B respectively illustrate the representative images of the web page 210 and the web page 230.

As shown in FIG. 2A, because the web page 210 specifies its web page size, the top left part of the web page 210 is determined as the particular area 220. When the web page 210 has been completely downloaded or the particular area 220 in the web page 210 has been downloaded, an image of the particular area 220 is captured and served as a representative image of the Internet bookmark of the web page, for example the representative image 310 in FIG. 3A. Herein the representative image 310 is, for example, captured according to the original scale of the image of the particular area 220.

In another example, as shown in FIG. 2B, because the web page 230 does not specify its web page size, the top middle part of the web page 230 is determined as the particular area 240. When the web page 230 has been completely downloaded or the particular area 240 in the web page 230 has been downloaded, an image of the particular area 240 is captured and served as a representative image of the Internet bookmark, for example the representative image 320 in FIG. 3B. Herein the representative image 320 is, for example, also captured according to the original scale of the image of the particular area 240.

Referring to FIG. 1 again, in step S115, the representative image is associated with a web address of the web page. To be specific, a hyperlink pointing to the web address of the web page is established in the representative image. Accordingly, when the representative image is activated, the web address associated with the representative image is automatically connected to. For example, the user may touch the representative image to link and open the web page, or the user may select the representative image by using navigation keys, a joystick, a keypad, a trackball, an optical mouse, a wheel, etc. to link and open the web page. Finally, in step S120, the representative image and the web address are saved so that the web address may be connected subsequently to by clicking on or selecting the corresponding representative image.

In one example, a title may be further embedded into the representative image or placed around the representative image. For example, a web page title of a web page is received when the web page is being downloaded, and the web page title is associated with the representative image (for example, by embedding the web page title into the representative image or placing the web page title under the representative image). Alternatively, an input title may also be received and associated with the representative image (for example, by embedding the input title into the representative image or placing the input title under the representative image). This will be described below by taking the image of the particular area 220 in FIG. 2A as an example.

Figure 4A:
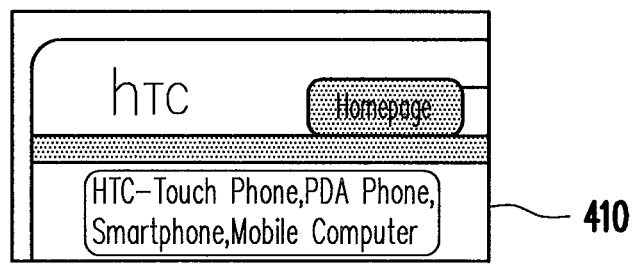
FIG. 4A and FIG. 4B are diagrams of representative images of web pages according to another example of the present application.
Figure 4B:
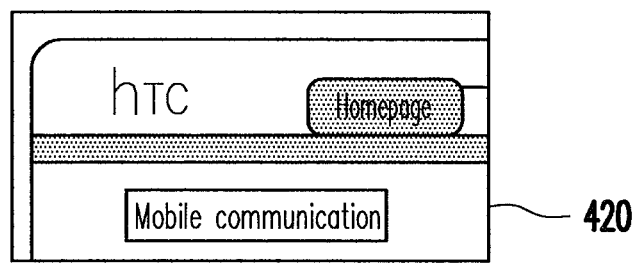

FIG. 4A and FIG. 4B are diagrams of representative images of web pages according to another example of the present application. In FIG. 4A, a web page title is embedded into the representative image 410, and in FIG. 4B, an input title is embedded into the representative image 420.

Generally, a web page saves its web page title after the tag <title> in the source file of the web page. Thus, the content after the tag <title> (i.e., the web page title) may be read from the source file of the web page and embedded into the representative image 410. Assuming the content after the tag <title> in the source file of the web page 210 is "HTC-Touch Phone, PDA Phone, Smartphone, Mobile Computer", the title "HTC-Touch Phone, PDA Phone, Smartphone, Mobile Computer" is embedded into the representative image 410, as illustrated in FIG. 4A.

In addition, the user may also input an input title, as shown in FIG. 4B, and embeds the input title "mobile communication" into the representative image 420. Moreover, if the user is not satisfied with the embedded web page title, the user may also directly edit and change the web page title in the representative image 410.

Furthermore, the user may both place the web page title under the representative image and embeds the input title into the representative image (not shown).

Figure 5:
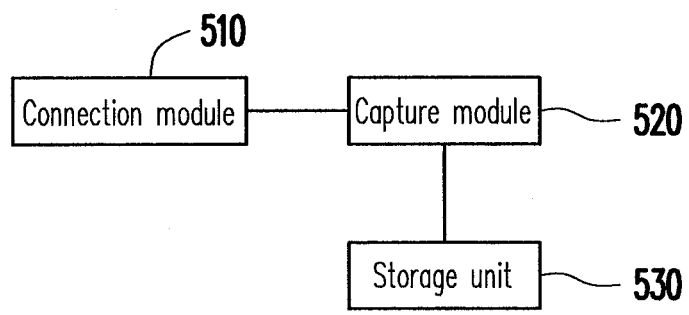
FIG. 5 is a block diagram of an Internet bookmark saving system according to an example of the present application.

The present application also provides an Internet bookmark saving system. FIG. 5 is a block diagram of an Internet bookmark saving system according to an example of the present application. Referring to FIG. 5, the system comprises a connection module 510, a capture module 520, and a storage unit 530. The capture module 520 is coupled to the connection module 510, and the storage unit 530 is coupled to the capture module 520.

The connection module 510 may be a browser for connecting to a web page. After the web page is completely downloaded, the capture module 520 captures an image of a particular area in the web page and serves the captured image as a representative image of an Internet bookmark of the web page. After that, the capture module 520 associates the representative image with a web address of the web page and saves the representative image and the web address into the storage unit 530. Herein the storage unit 530 may be a hard disk, a flash memory, a random access memory (RAM), or a cache memory.

After the capture module 520 stores the captured image into the storage unit 530 as a representative image, the connection module 510 connects to the web address associated with the representative image when the representative image is activated.

Figure 6:
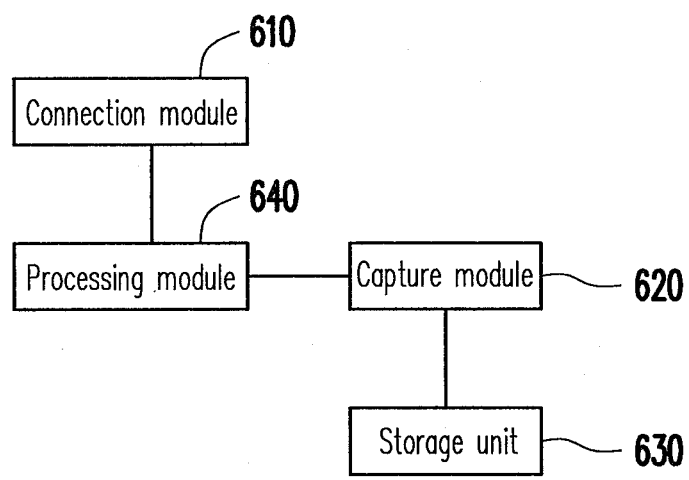
FIG. 6 is a block diagram of an Internet bookmark saving system according to another example of the present application.

The present application provides another Internet bookmark saving system. FIG. 6 is a block diagram of an Internet bookmark saving system according to another example of the present application. Referring to FIG. 6, the system comprises a connection module 610, a capture module 620, a storage unit 630, and a processing module 640. The capture module 620 is coupled to the connection module 610, the storage unit 630 is coupled to the capture module 620, and the processing module 640 is respectively coupled to the connection module 610 and the capture module 620. The functions of the connection module 610, the capture module 620, and the storage unit 630 are the same as or similar to those of the connection module 510, the capture module 520, and the storage unit 530 described above therefore will not be described herein.

In the present example, the processing module 640 determines whether the web page specifies a web page size. If the processing module 640 determines that the web page specifies the web page size, the processing module 640 determines the top left part of the web page as a particular area (as shown in FIG. 2A and FIG. 3A). If the processing module 640 determines that the web page does not specify the web page size, the processing module 640 determines the top middle part of the web page as the particular area (as shown in FIG. 2B and FIG. 3B). In addition, the processing module 640 may also receive a web page title of the web page, and the capture module 620 associates the web page title with the representative image (as shown in FIG. 4A). Alternatively, the processing module 640 may also receive an input title, and the capture module 620 associates the input title with the representative image (as shown in FIG. 4B).

In the above mentioned examples, although the various modules or units are depicted in a single software application, the modules or units may also be run in separate components or processes that collaborate. Many of these functions could be provided by the operating system of the device, rather than by the specific application. In some examples, some of the modules or units are implemented in hardware instead of software. Further, some modules or units are shown as separate components, the modules could also be implemented in a single component for efficiency or convenience.

The present application further provides a computer-readable medium composed of program instructions for executing the Internet bookmark saving method described above. The computer-readable medium comprises a plurality of program instructions (for example, an organization chart establishing program instruction, a table approving program instruction, a setting program instruction, and a deployment program instruction, etc). These program instructions can be loaded into an electronic device and executed by the same to accomplish the steps in foregoing Internet bookmark saving method and the functions of foregoing Internet bookmark saving system.

As described above, in the present application, an image of a particular area in a web page is captured and served as a representative image of an Internet bookmark of the web page, so that the Internet bookmark may be presented in a more intuitional way. In addition, if the image of the entire web page is served as the representative image, the representative image has to be compressed when the user browses the web page. As a result, the resolution of the representative image is greatly reduced and it becomes difficult for the user to identify the web page. In a small-sized device (for example, a mobile phone, smartphone, PDA (Personal Digital Assistance), PDA phone, smartphone, handheld navigation device, handheld game device, handheld media player, etc), the limited size of the display does not allow the representative image to be clearly presented. Accordingly, in the present application, an image of a particular area in a web page is captured and served as the representative image of the Internet bookmark of the web page, and the representative image is saved in an original scale of the captured image so that the image of the web page may be clearly displayed when a user browses the Internet bookmark.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An Internet bookmark saving method, comprising:
    connecting to a web page;
    determining whether the web page specifies a web page size to generate a determination result;
    capturing an image of a particular area in the web page according to the determination result and serving the image as a representative image of an Internet bookmark of the web page;
    associating the representative image with a web address of the web page; and
    saving the representative image and the web address.

2. The method according to claim 1, wherein the image of the particular area in the web page is captured when the web page is being downloaded or after the web page is downloaded.

3. The method according to claim 1, wherein after the web page is downloaded, the Internet bookmark saving method further comprises:
    receiving a web page title of the web page and associating the web page title with the representative image.

4. The method according to claim 3, wherein the step of associating the web page title with the representative image comprises embedding the web page title into the representative image.

5. The method according to claim 1, wherein after the web page is downloaded, the Internet bookmark saving method further comprises:
    receiving an input title and associating the input title with the representative image.

6. The method according to claim 5, wherein the step of associating the input title with the representative image comprises embedding the input title into the representative image.

7. The method according to claim 1, wherein the representative image is in an original scale of the image.

8. The method according to claim 1, wherein the web address associated with the representative image is connected to when the representative image is activated.

9. The method according to claim 1, wherein after the step of determining whether the web page specifies a web page size, further comprises:
    if the web page specifies the web page size, determining a top left part of the web page as the particular area, wherein the top left part starts in a top left corner of the displayed web page.

10. The method according to claim 1, wherein, after the step of determining whether the web page specifies a web page size, further comprising:
    if the web page does not specify the web page size, determining a top middle part of the web page as the particular area, wherein a centreline of the top middle part of the web page starts in a top centre of the displayed web page.

11. An Internet bookmark saving system, comprising:
    a connection module, for connecting to a web page;
    a capture module, coupled to the connection module, for capturing an image of a particular area in the web page and serving the image as a representative image of an Internet bookmark of the web page, and for associating the representative image with a web address of the web page;
    a storage unit, coupled to the capture module, for storing the representative image and the web address; and
    a processing module, respectively coupled to the connection module and the capture module, for determining whether the web page specifies a web page size, wherein if the web page specifies the web page size, the processing module determines a top left part of the web page as the particular area, and if the web page does not specify the web page size, the processing module determines a top middle part of the web page as the particular area, wherein the top left part starts in a top left corner of the displayed web page, and a centreline of the top middle part of the web page starts in a top centre of the displayed web page.

12. The system according to claim 11, wherein the capture module captures the image of the particular area in the web page when the web page is being downloaded or after the web page is downloaded.

13. The system according to claim 11, wherein the processing module further receives a web page title of the web page, and the capture module associates the web page title with the representative image.

14. The system according to claim 13, wherein the capture module further embeds the web page title into the representative image.

15. The system according to claim 11, wherein the processing module further receives an input title, and the capture module associates the input title with the representative image.

16. The system according to claim 15, wherein the capture module further embeds the input title into the representative image.

17. The system according to claim 11, wherein the representative image is in an original scale of the image.

18. A computer-readable medium comprising instructions for performing the method comprising the following steps:
    connecting to a web page;
    determining whether the web page specifies a web page size;
    if the web page specifies the web page size, determining a top left part of the web page as a particular area, wherein the top left part starts in a top left corner of the displayed web page;
    if the web page does not specify the web page size, determining a top middle part of the web page as the particular area, wherein a centreline of the top middle part of the web page starts in a top centre of the displayed web page;
    capturing an image of the particular area in the web page, and serving the image as a representative image of an Internet bookmark of the web page;
    associating the representative image with a web address of the web page; and
    saving the representative image and the web address.

* * * * *